Dec. 23, 1958    N. KLOMPAS    2,865,661
MEANS FOR LOCKING A REMOVABLE COUPLING PIN
Filed Jan. 9, 1956
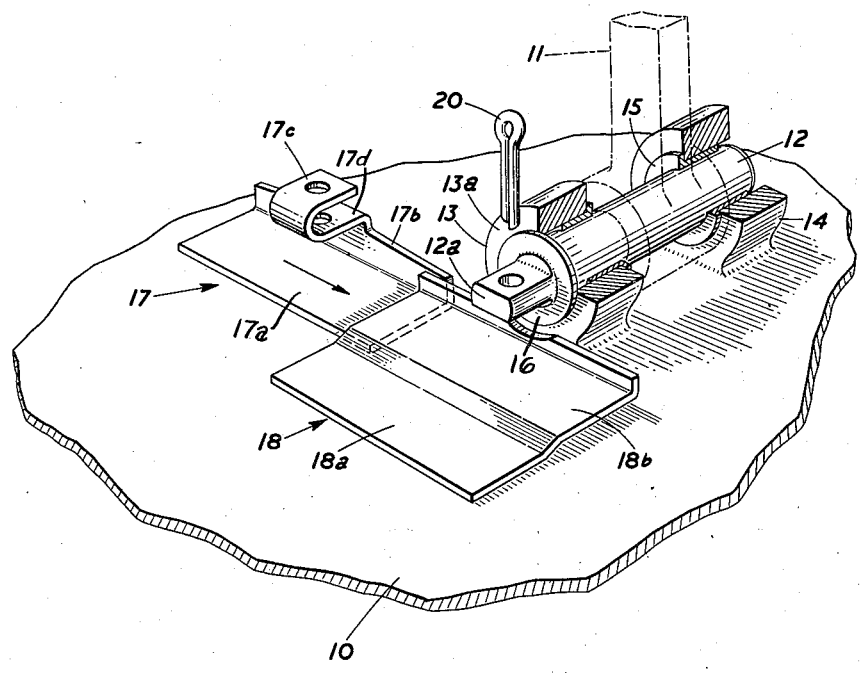
Inventor
NICHOLAS KLOMPAS
By: Maybee & Legris
Att'ys

# United States Patent Office 2,865,661
Patented Dec. 23, 1958

2,865,661

MEANS FOR LOCKING A REMOVABLE COUPLING PIN

Nicholas Klompas, Beverly Hills, Ontario, Canada, assignor to Orenda Engines Limited, Malton, Ontario, Canada, a corporation Application January 9, 1956, Serial No. 558,160

2 Claims. (Cl. 287—20)

This invention relates to removable means for locking a demountable coupling pin or the like in a bearing or like fitting on the surface of a body, so that the pin may be used to couple a rod or link to the body of an engine or the like by means of an eye provided on the end of the link to receive the pin, and it relates particularly to means for locking the pin at one end when the pin is inserted axially in the bearing from that end.

Another object of the invention is to provide a locking arrangement of this kind that uses a simple cotter pin as a locking element.

These objects are attained by the embodiment of the invention disclosed in the following description and the accompanying drawing, which is of a rear trunnion pin for a gas turbine engine.

This drawing is a perspective view of locking means according to the invention, showing some of the parts in section and showing the body to which the locking means is attached broken away.

In the drawing, the surface 10 may be part of the body of a gas turbine engine to which a suspending or supporting rod or link 11 is articulated by means of a removable coupling pin 12. The pin is slidable along its length in front and rear co-axial bearings 13, 14 respectively, attached to the surface by welding or the like. Bushings 15 may be used within the bearings if desired, according to conventional practice. The pin 12 has a pin-stop 16, in the form of an annular circumferential flange, near its front end, that engages the front face 13a of the front bearing 13 to prevent the pin from being inserted too far into the bearings. The front end part of the pin forms a locking projection 12a forward of the flange 16 and preferably with flattened top and bottom surfaces to reduce its vertical depth.

The pin is removably held in the bearing by interposing a locking piece 17 between the pin 12 and a stop 18 on the body. The locking piece is preferably made of sheet material bent so as to be S-shaped in section, the S-shape including a body-engaging part 17a, a pin-stop engaging part 17b, and upper and lower pin-engaging surfaces 17c and 17d respectively.

The body engaging part 17a is shaped to co-operate with the stop 18, which is formed of sheet material with a fastening part 18a welded to the body and a clamping part 18b spaced from the body by the thickness of the locking piece 17.

After the pin is inserted in the bearings, the locking piece is slid transversely into place with its body-engaging part 17a under the clamping part 18b of the stop 18 and its pin-stop engaging part 17b immediately in front of the pin-stop flange 16. In this position, the locking projection 12a of the pin lies between the pin-engaging surfaces 17c and 17d, and a hole is provided in each of these members, the three holes being in vertical alignment to receive a removable locking member 20, such as a cotter pin. This prevents the locking piece 17 from being withdrawn from the stop 18, and secures the whole assembly firmly together.

The foregoing description sets forth the best mode contemplated by the inventor of carrying out his invention but the following claims are intended to cover all useful changes and modifications of the said mode which are within the scope of the invention.

What I claim as my invention is:

1. A demountable coupling pin for coupling a rod or link to a body, comprising a bearing attached to the body, a pin removably received and slidable along its length in the bearing and having one end projecting from the bearing, a flange on the projecting part of the pin and engaging the bearing to prevent the projecting part from entering the bearing, a stop on the body spaced from and in line with the projecting part of the pin and having a fastening part secured to the body and a clamping part, a locking piece between the projecting part of the pin and the stop, the locking piece having a body engaging part engaging the clamping part of the stop, and means positively connecting the locking piece to the projecting part of the pin.

2. A demountable coupling pin for coupling a rod or link to a body, comprising a bearing attached to the body, a pin removably received and slidable along its length in the bearing and having one end projecting from the bearing, a flange on the projecting part of the pin and engaging the said one of the bearings to prevent the projecting part from entering the said one of the bearings, a stop on the body spaced from and in line with the projecting part of the pin and having a fastening part secured to the body and a clamping part spaced from the body, a locking piece between the projecting part of the pin and the stop, the locking piece having a body engaging part arranged in the space between the clamping part of the stop and the body and having a pin-stop engaging part engaging the flange on the pin to prevent the pin from being withdrawn from the bearing, and having upper and lower pin-engaging surfaces adjacent the projecting part of the pin, and a locking member extending through the said surfaces and through the projecting part of the pin to positively connect the locking piece to the pin.

References Cited in the file of this patent

UNITED STATES PATENTS

| | | |
|---|---|---|
| 273,064 | Goldsmith | Feb. 27, 1883 |
| 336,825 | Stair | Feb. 23, 1886 |
| 683,764 | Hopgood | Oct. 1, 1901 |
| 2,165,699 | Fisher | July 11, 1939 |
| 2,397,964 | Hiniker | Apr. 9, 1946 |
| 2,562,649 | Steensen | July 31, 1951 |
| 2,705,157 | Dail | Mar. 29, 1955 |